United States Patent [19]
Danielson et al.

[11] Patent Number: 5,791,853
[45] Date of Patent: Aug. 11, 1998

[54] SUPPORT BAND FOR MOVABLE FLEXIBLE CABLE ASSEMBLY

[75] Inventors: Craig Thomas Danielson; James Leroy Overacker; Gustave Christian Stern; Martin David Williams, all of Tucson, Ariz.

[73] Assignee: International Business Machines Corporation, Armonk, N.Y.

[21] Appl. No.: 859,828

[22] Filed: May 16, 1997

Related U.S. Application Data

[62] Division of Ser. No. 338,292, Nov. 14, 1994, Pat. No. 5,669,749.

[51] Int. Cl.⁶ .................................. B65G 1/04
[52] U.S. Cl. .......................... 414/280; 191/12 R
[58] Field of Search .................. 364/478.01; 369/36; 360/98.06, 92; 104/165, 173.1, 87; 414/273, 277, 752, 281, 282, 750, 751, 283, 749; 254/387; 191/12 R, 12 C; 248/51, 49; 74/24

[56] References Cited

U.S. PATENT DOCUMENTS

| | | | |
|---|---|---|---|
| 2,458,573 | 1/1949 | Donahue | 191/12 R X |
| 4,394,531 | 7/1983 | Delabie | 174/24 |
| 4,691,782 | 9/1987 | Stine | 168/12 |
| 4,898,351 | 2/1990 | Suzuki | 248/51 |
| 5,020,958 | 6/1991 | Tuttobene | 414/273 X |
| 5,132,789 | 7/1992 | Ammon et al. | 414/273 X |
| 5,228,016 | 7/1993 | Menke | 369/36 |
| 5,343,989 | 9/1994 | Hu et al. | 191/12 |

FOREIGN PATENT DOCUMENTS

| | | | |
|---|---|---|---|
| 100086 | 6/1982 | Japan | 191/12 R |
| 1-168475 | 7/1989 | Japan . | |
| 285912 | 11/1990 | Japan | 191/12 R |

OTHER PUBLICATIONS

Japanese Patent Information Organization (JAPIO) Abstract of Japanese Patent No. JP01-168475.
Japanese Patent Information Organization (JAPIO) Abstract of Japanese Patent No. JP01-143103.
IGUS System E4, Product for Series 30 and Series 35 Energy Chains, Pub. date unknown, available at least Nov. 1, 1994.

*Primary Examiner*—Frank E. Werner
*Attorney, Agent, or Firm*—Gray Cary Ware & Freidenrich

[57] ABSTRACT

The present invention provides a flexible cable and support band assembly which is dynamically stable at high speeds over long lengths. This has been accomplished by cupping both the flexible cable and the support band in cross section along their lengths so that they cup one within the other to essentially move as a unit even though they are not attached except at their ends. A single support band can be employed to support multiple flexible cables. Additional support has been provided by employing resilient spaced apart strips along a track upon which the one or more flexible cables and support band slide. The resilient strips center the travel of the one or more flexible cables and support band and minimize rocking motion and vibration. Still further the one or more flexible cables and support band are arranged with respect to a robotic media library so that a single length of the one or more flexible cables and the support band will serve a range of lengths of the library.

33 Claims, 11 Drawing Sheets

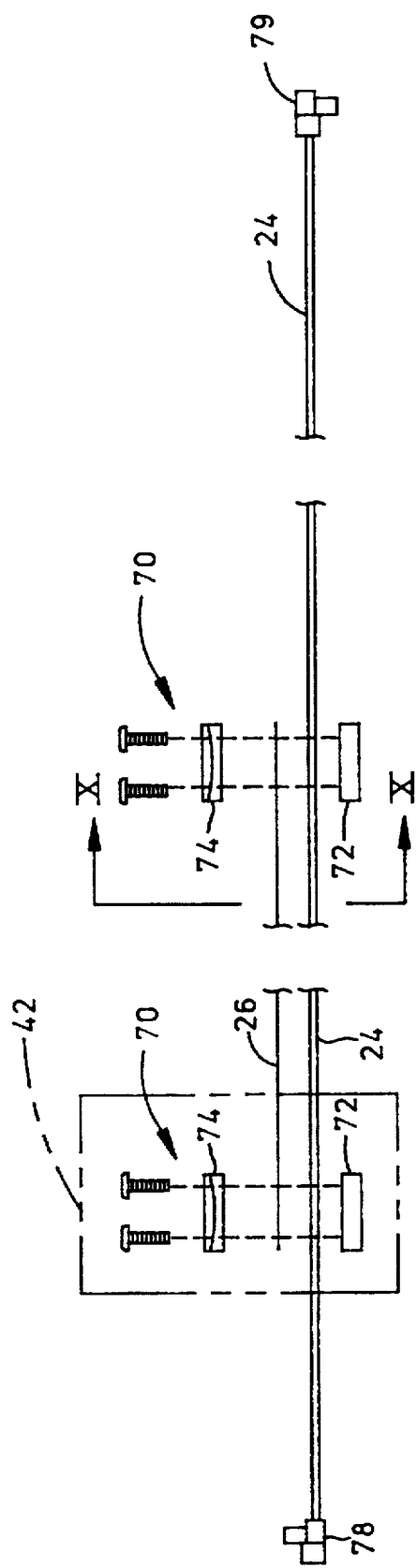
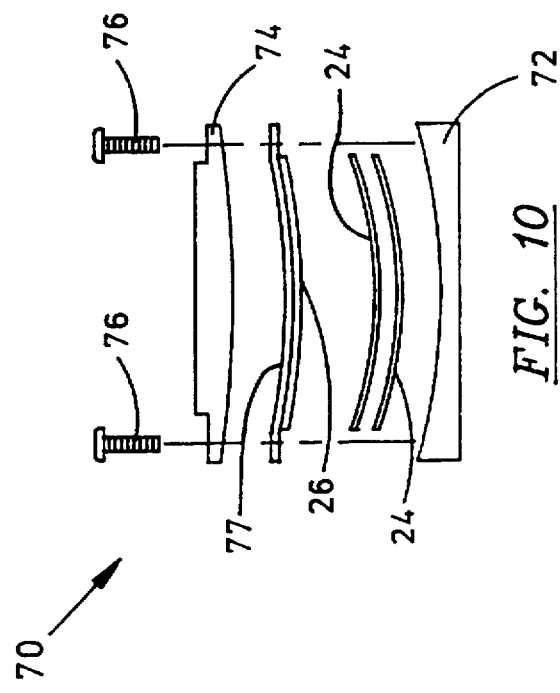
FIG. 9
FIG. 10

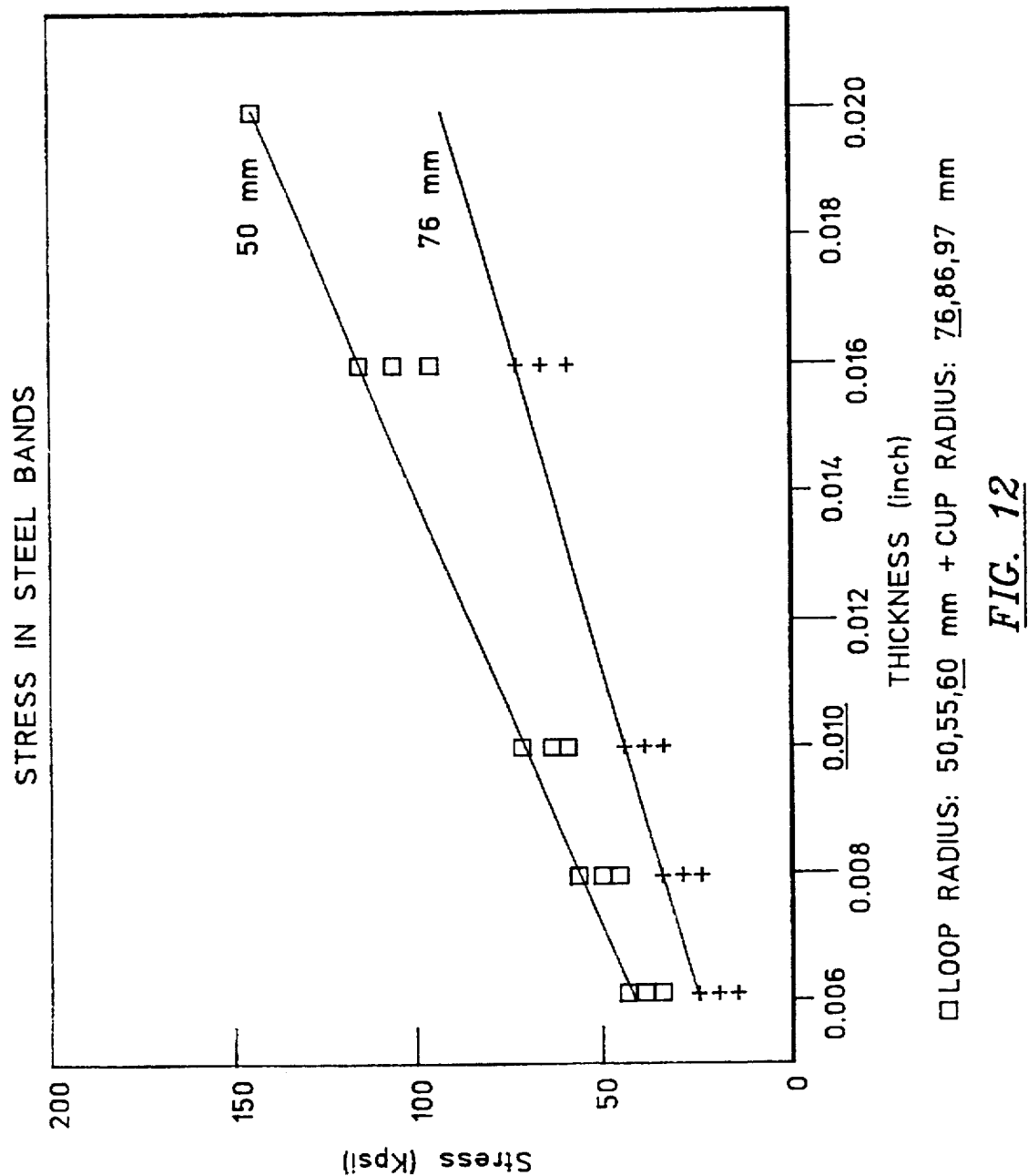

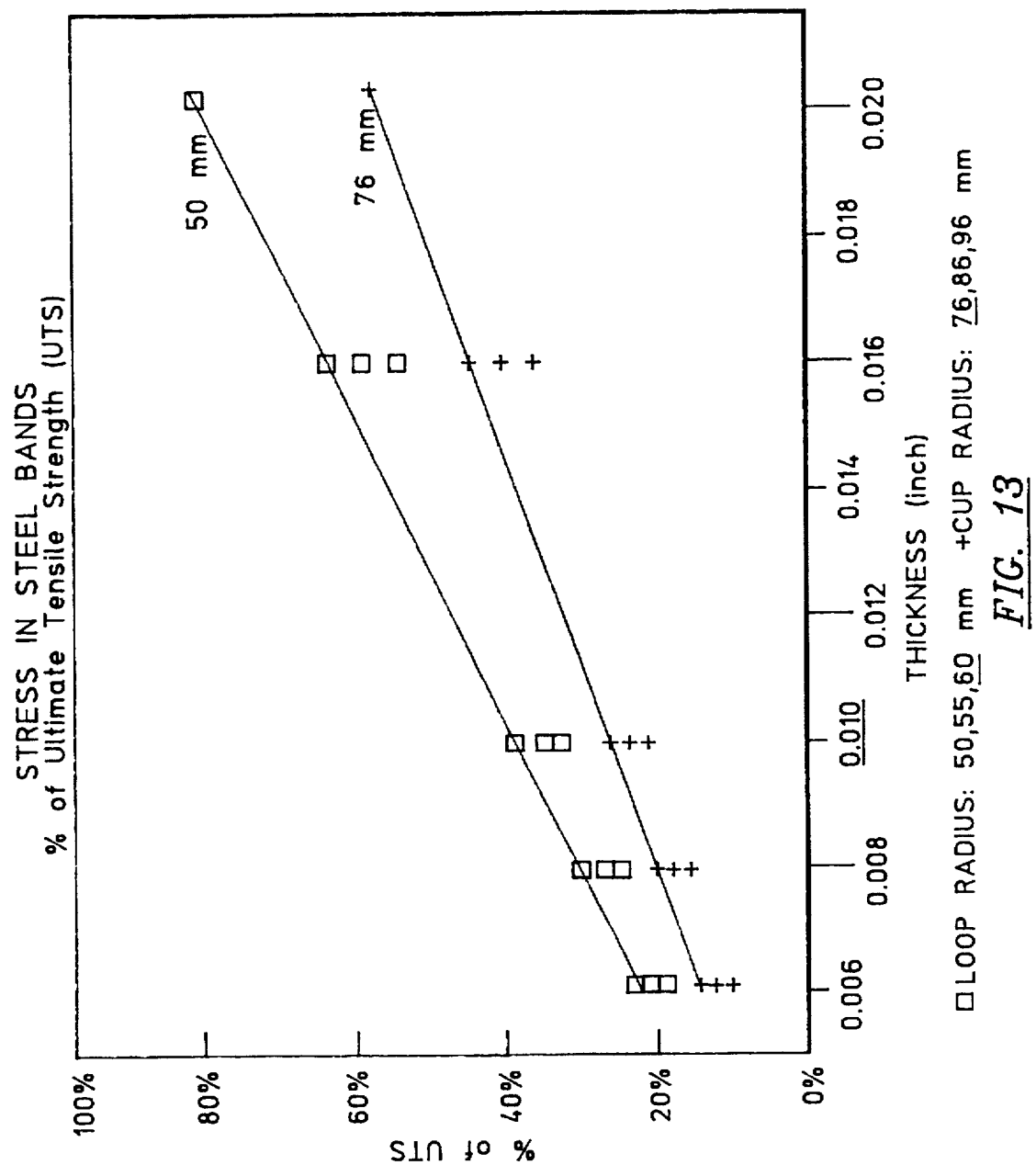

SUPPORT BAND FOR MOVABLE FLEXIBLE CABLE ASSEMBLY

CROSS REFERENCE TO RELATED APPLICATION

This application is a divisional of application Ser. No. 08/338,292 filed Nov. 14, 1994, now U.S. Pat. No. 5,669,749.

BACKGROUND OF THE INVENTION

1. Field of the Invention

The present invention relates to a movable flexible cable and support band assembly and more particularly to a support band which supports one or more flexible cables, the band and cable looping back on themselves and moving with a movable component, such as an accessor in a robotic media library.

2. Description of the Related Art

Automated data storage libraries which archive magnetic tape and magnetic or optical disks have become important for storing large amounts of data. A typical magnetic tape library has a wall of receptacles or bins which store numerous magnetic tape cartridges, and includes one or more tape drives. Such a library typically includes an accessor that moves horizontally and carries a vertically positionable cartridge picker for transporting cartridges between receptacles and a drive. It is desirable that such a library be modular so that it can be fashioned to meet the capacity of a user and can be easily changed in size if the user's requirements change.

An accessor executes cycles of fast movement. A host system transmits power and control signals to the accessor via a flexible cable which is connected to the accessor and which moves therewith. The flexible cable folds back on itself in a loop so that it can be easily extended from one end of the library to the other. The loop is continually subjected to extreme stress yet it must be capable of functioning reliably for millions of cycles without failure. During this time the cable must be prevented from sliding upon itself in order to prevent wear and galling. Wear can render the cable inoperative and galling produces debris which contaminants the library.

A solution to the debris problem is addressed in commonly assigned U.S. Pat. No. 5,343,989 which describes stainless steel tabs mounted on flexible cable to prevent galling. Another solution is to loop the flexible cable around a pulley or spool which is attached to a spring. The spring keeps the flexible cable taut to prevent rubbing. A further scheme is to drape the flexible cable over spaced apart moving rollers. Still another scheme is to enclose the flexible cable in an articulated moving cage which provides gravity support. Some of these schemes are unduly complex, costly and must be designed and used with care to prevent damage to the cable.

In U.S. Pat. No. 4,898,351 a flexible cable is supported by a support band over relatively short lengths in a printer or a typewriter. The flexible cable and the support band are coextensive in length and move together back and forth about a loop as described hereinabove. The support cable is cupped in cross section so that it has increased lengthwise strength in the same manner as a steel measuring tape. The flexible cable is flat and essentially makes line contact with the support band along its length. For short lengths this scheme provides adequate stability. This scheme is not satisfactory for long lengths as found in a tape library. The line contact between the flexible cable and the support band causes the flexible cable to be unstable. This instability allows rocking motion at high speeds which causes stress and shortens the life of the flexible cable.

SUMMARY OF THE INVENTION

The present invention provides a movable flexible cable and support band assembly which is dynamically stable at high speeds over long lengths. This is accomplished by providing the flexible cable with a cupped cross section which matches or is concentric with the cupped cross section of the support band. With this arrangement, one cupped element is cupped within another cupped element so that the flexible cable and the support band cooperate in a unitary fashion as they move together even though they are unattached except at their ends. The inventors have found that this scheme provides stability even though multiple flexible cables are supported by a single support band. By employing multiple flexible cables the power and signal requirements of large tape libraries can be met.

The inventors have also discovered that stability of the one or more flexible cables and the support band is even further increased by providing resilient guides along an elongated support plate upon which a bottom length of the combined flexible cable and support band slide. In a preferred embodiment a pair of spaced apart rubber-like strips extend along the plate to guide the one or more flexible cables and support band. This guidance centers travel along the support plate, prevents rocking motion and dampens vibrations of the one or more flexible cables and support band as they move rapidly to various locations in the library.

The inventors have further discovered that by proper placement a single length of one or more flexible cables and support band will serve a range of sizes of a library arranged in modular form. For instance one length is provided which will serve a one or two frame library, a longer length is provided which will serve a three or four frame library and a still longer length is provided which will serve a five to eight frame library.

An object of the present invention is to provide a flexible cable and support band assembly which is stable when moved at high speeds over long lengths.

Another object is to provide a combined flexible cable and support band which can move at high speeds in a straight line along a track with minimum rocking motion and vibration.

A further object is to provide a flexible cable and support band scheme which will serve a range of sizes of library lengths.

Still another object is to provide a robotic media library which has a simplified arrangement for delivering power and signals between a host and an accessor.

Still a further object is to provide a robotic media library which has a dynamically stable flexible cable and support band assembly which will serve a range of library lengths.

These and other objects will become more apparent to one skilled in the art upon reading the following specification with reference to the accompanying drawings.

DESCRIPTION OF THE DRAWINGS

FIG. 9 is a view taken along plane IX—IX of FIG. 8 with the connectors exploded.

FIG. 10 is a view taken along plane X—X of FIG. 8.

FIG. 12 is a chart of stress in steel bands versus band thicknesses for various loop radii and various cup radii.

FIG. 13 is a chart of percentage of ultimate tensile stress in steel bands versus band thickness for various loop radii and various cup radii.

DESCRIPTION OF THE PREFERRED EMBODIMENTS

Figure 1:
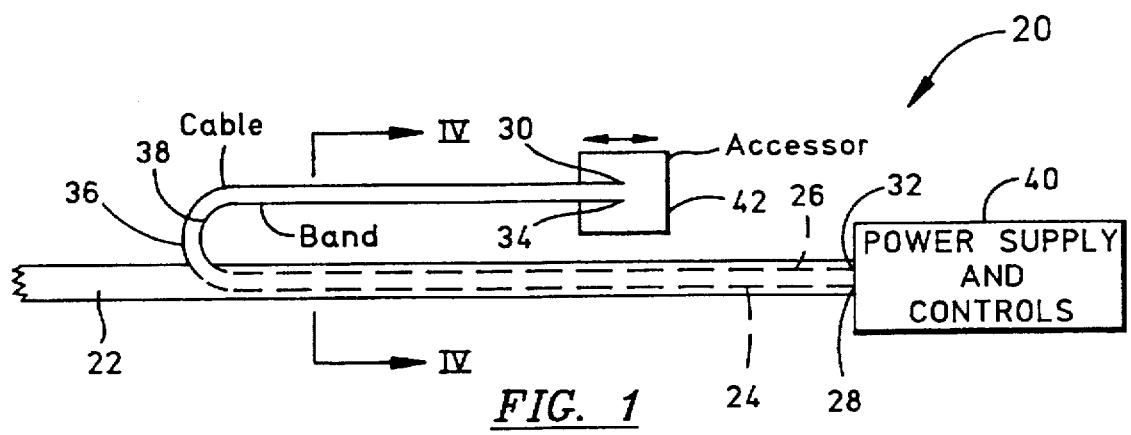
FIG. 1 is a schematic side view of the present invention.

Referring now to the drawings wherein like reference numerals designate like or similar parts throughout the several views, there is illustrated in FIG. 1, a movable flexible support band assembly 20 which may be employed to provide power and control signals for a robotic magnetic tape cartridge library which will be described in more detail hereinafter. The assembly includes an elongated support, such as a U shaped channel 22. Resting within the channel is a flexible cable 24 and a support band 26, the flexible cable having first and second ends 28 and 30 and the support band having first and second ends 32 and 34. The flexible cable 24 and the support band 26 are curved along their lengths to form a loop at 36 and 38, respectively, with first and second lengths of each of the flexible cable and support band extending therefrom. The flexible cable and the support band are co-extensive and substantially engage one another along their lengths.

Figure 2:
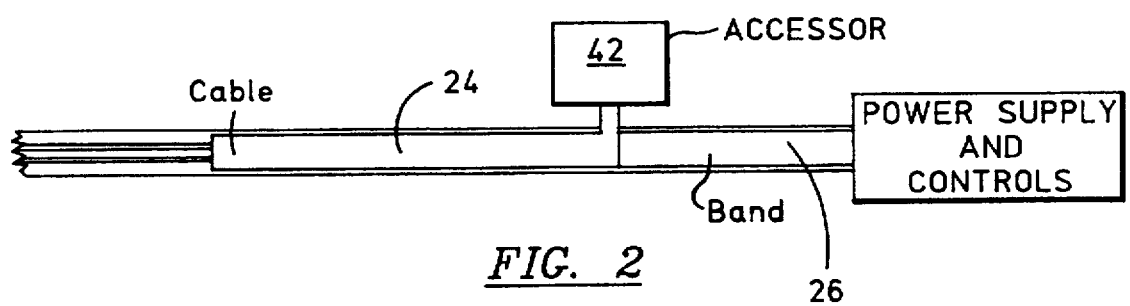
FIG. 2 is a top plan view of FIG. 1.

The first end 28 of the flexible cable is fixed to or fixed in relationship to the channel 22 and is connected to power supply and controls 40. The first end of the support band 32 may be commonly fixed in relationship to the channel 22 which will be described in more detail hereinafter. The second end 30 of the flexible cable and the second end 34 of the support band may be connected to an accessor 42 which reciprocates horizontally back and forth within a tape library. The accessor makes many starts and stops and moves at high speeds which subjects the flexible cable to highly dynamic rocking and vibrational forces. FIG. 2 is a top view of FIG. 1.

Figure 3:
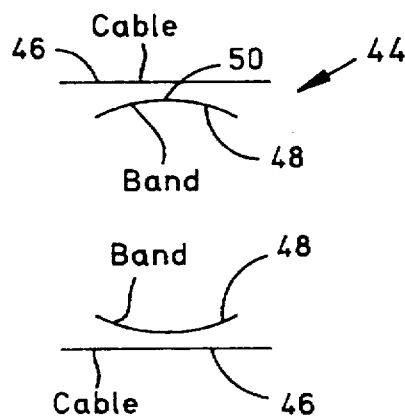
FIG. 3 is a cross section through a prior art flexible cable and support band assembly.

FIG. 3 illustrates a prior art flexible cable and support band assembly which employs a flat flexible cable 46 in engagement with a cupped shaped support band 48. Because the support band 48 is cupped in cross-section it provides support for the flexible cable in the same manner as a self-supporting steel measuring tape. The assembly 44 has been employed for printing devices and typewriters which operate at short lengths. In long lengths, such as a magnetic tape library, the flexible cable operates under much higher dynamic loading. More specifically, the longer lengths subjects the flexible cable to vibration and torsional forces due to rocking motion. The line contact 50 made between the flexible cable and the support band in the prior art assembly, leaves a majority of width of the flexible cable unsupported causing it to rock and vibrate.

Figure 4:
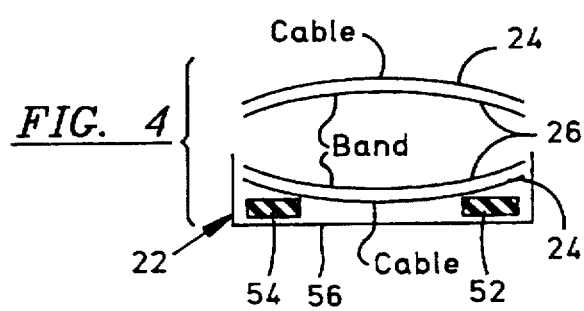
FIG. 4 is view taken along plane IV—IV of FIG. 1.

We have discovered that by providing each of the flexible cable 24 and the support band 26, with a cross section as illustrated in FIG. 4, that the flexible band completely supports the flexible cable across its width over long lengths so as to minimize rocking motion and vibration of flexible cable as it rapidly reciprocates back and forth in a tape library. In a preferred embodiment, the flexible cable and the support band are cupped upwardly along their bottom lengths with the flexible cable below the support band and the flexible cable and support band are cupped downwardly along their upper lengths with the flexible cable on top of the support band and being supported by the support band between the loop 38 and the second end 30 of the flexible cable. In some embodiments it may be desirable to cup the flexible cable 24 and the support band 26 downwardly along their bottom lengths and cup the flexible cable and the support upwardly along their upper lengths. Further, the assembly 20 may be oriented vertically, instead of horizontally, in which case it is preferred that the support band be located inwardly of the flexible cable within the loop. In all embodiments, however, one of the flexible cable and the rigid band are cupped within the other of the flexible cable and the rigid band. This unique relationship allows the support band to support more than one flexible cable which will be described in more detail hereinafter.

Figure 5:
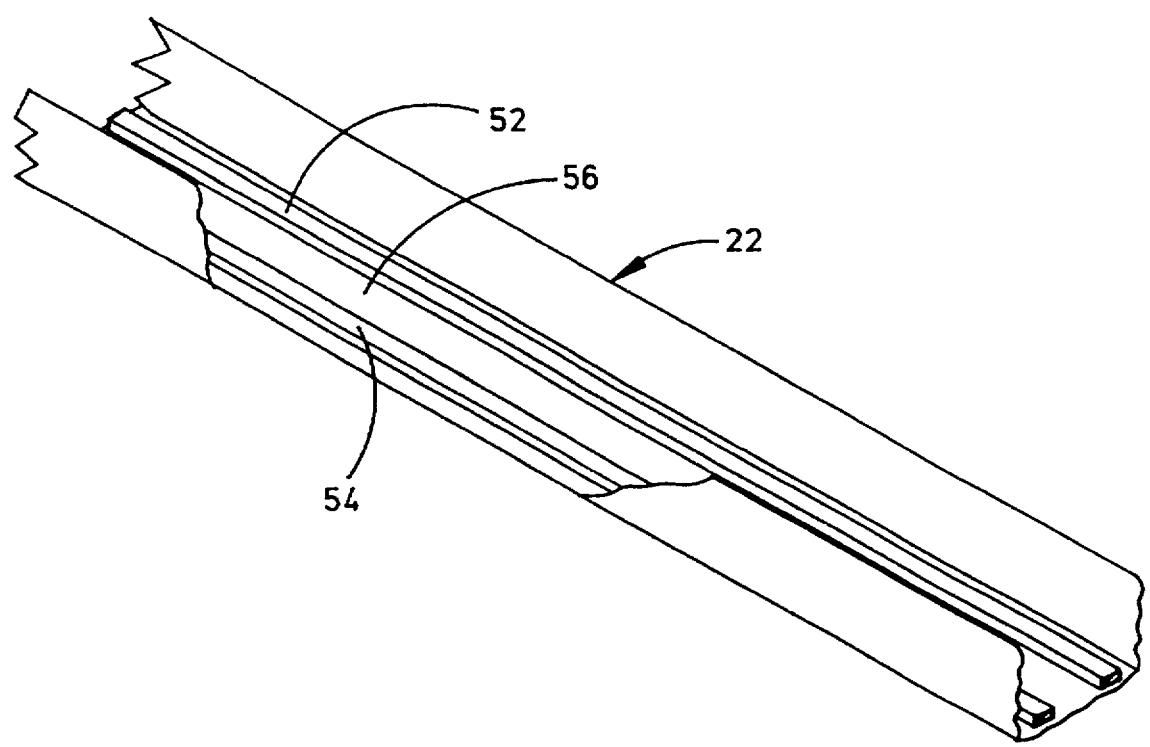
FIG. 5 is an enlarged isometric view of a U shaped guide rail, shown in cross section in FIG. 4, with a portion of the rail cut away to show the pair of resilient strips.

We have discovered additional means for minimizing rocking motion and vibration of the flexible cable during high speed travel. As shown in FIGS. 4 and 5, this has been accomplished by providing resilient strips 52 and 54 which are fixed in a spaced relationship in a bottom plate 56 of the channel 22. The resilient strips are spaced one on each side of the center of the width of each of the flexible cable 24 and the support band 26 so that the flexible cable and the support band have limited rocking movement as they travel above the plate 56. The strips 52 and 54 provide guidance for the flexible cable and the support band. The strips center the travel of the flexible cable and the rigid band along the plate 56 and dampen vibration forces. In some embodiments, discrete pads may be used in lieu of strips. It is desirable that the strips be constructed of a foam rubber like material. The material of the strips can be rubber, neoprene or plastic. While the strips are shown as rectangular in cross-section, they could be curved to match the cupping of the flexible cable and support band.

Figure 6:
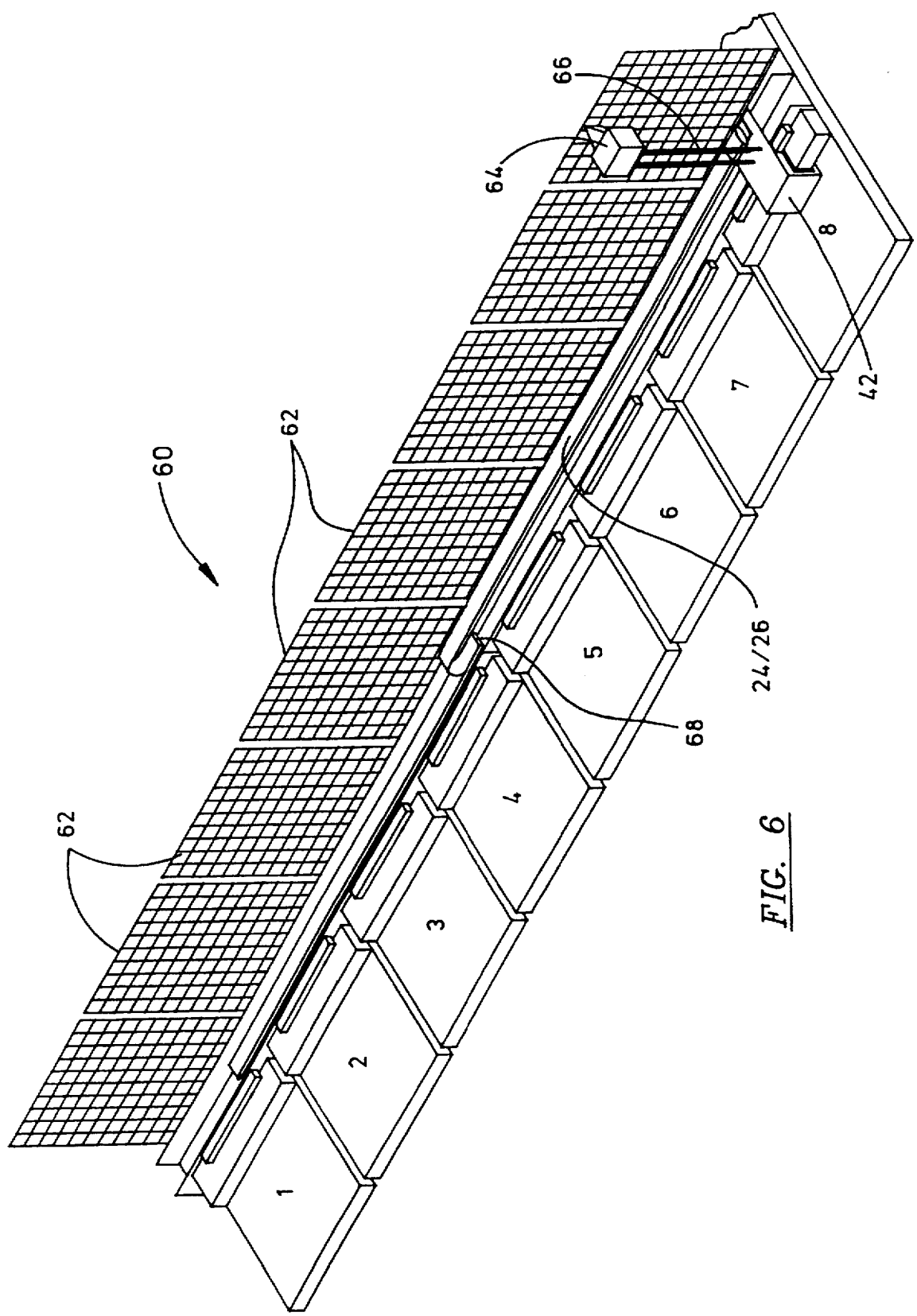
FIG. 6 is an isometric view of an exemplary magnetic tape library which shows the flexible cable and support band assembly of the present invention.
Figure 7:
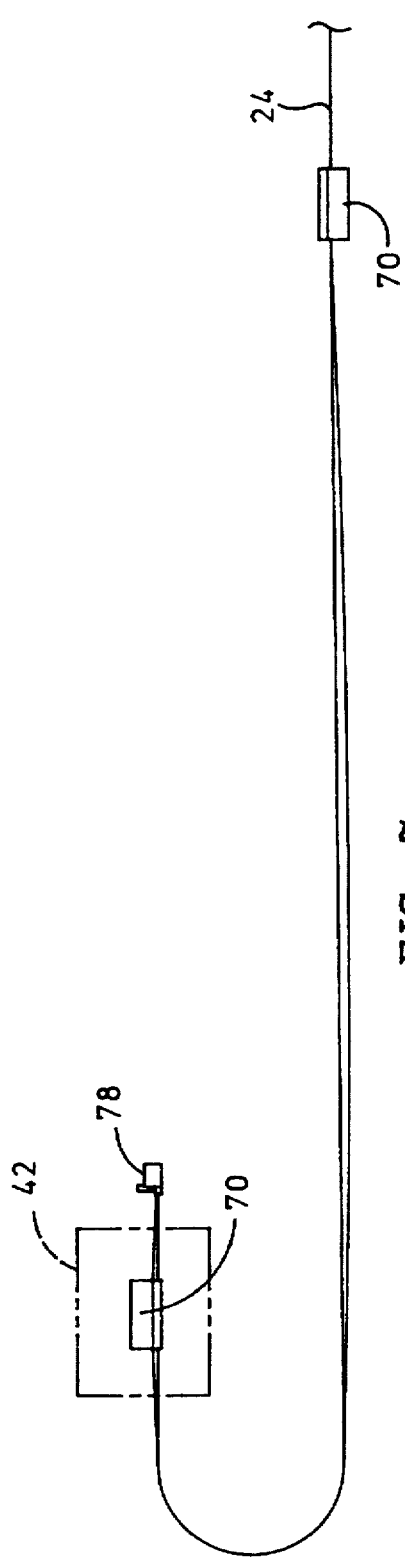
FIG. 7 is a side view of a flexible cable and support band making a loop and having a connector at each end.

FIG. 6 illustrates an exemplary magnetic tape cartridge library 60 which may employ the flexible cable 24 and support band 26 assembly of the present invention. This library has multiple frames 62, each frame being separable and having a plurality of receptacles or bins for storing a plurality of tape cartridges (not shown) and drives (not shown). Accordingly, the library can be sized to meet the capacity requirements of a user. The accessor carries a cartridge picker 64, which is movable vertically on a movable support 66 so that with combined horizontal and vertical movements the picker 64 can pick a tape cartridge from any bin within the library. It should be understood that this type of library can be employed for magnetic tape cartridges or magnetic or optical disks. The second ends of the flexible cable and support band are connected at a center location 68 of the library, which support the modular concept of the library to be described in more detail hereinafter. As the accessor 64 moves from frame 8 to frame 1, the loop moves from near the center location 68 to frame 1.

Figure 8:
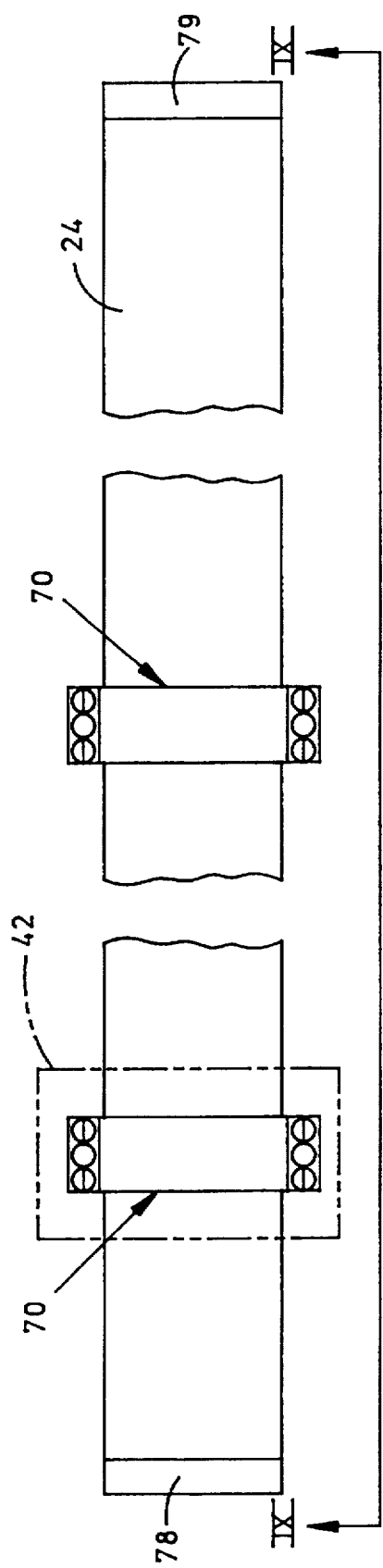
FIG. 8 is a plan view of the support band and connectors before being looped.

We have provided a unique connector for connecting each end of the flexible cable and support cable, as shown in FIGS. 7–10. As shown in FIG. 10, the connector 70 includes a pair of plates 72 and 74, which are cupped to clamp of the flexible cable and the support band. End portions of the flexible cable and the support band are located between the plates and are squeezed therebetween and tightly secured when the plates are affixed together by bolts 76. The end portion of the support band 26 may be extended by a thin welded plate 77 of a larger width so that the bolts 76 do not penetrate and weaken the end of the support band. One of the connectors may be rigidly fixed to the accessor and the other connector 70 may be rigidly fixed to the U shaped channel. The embodiment shown in FIG. 10 illustrates the assembly as including one support band and two flexible cables, which will be described in more detail hereinafter. As shown in FIGS. 8 and 9, the right connector may be connected at the center location within the library, which is shown at 68 in FIG. 6. The left connector, which is connected to the accessor 42, makes a loop to the right and above the right connector and the flexible cables 24 may extend from the right connector to a terminal end of the library for connection to power supplies and controls 40, which is shown in FIG. 1. A plug 78 may connect the one or more flexible cables to the accessor 42 and a plug 79 may connect the one or more flexible cables to power supply and control 40.

Figure 11:
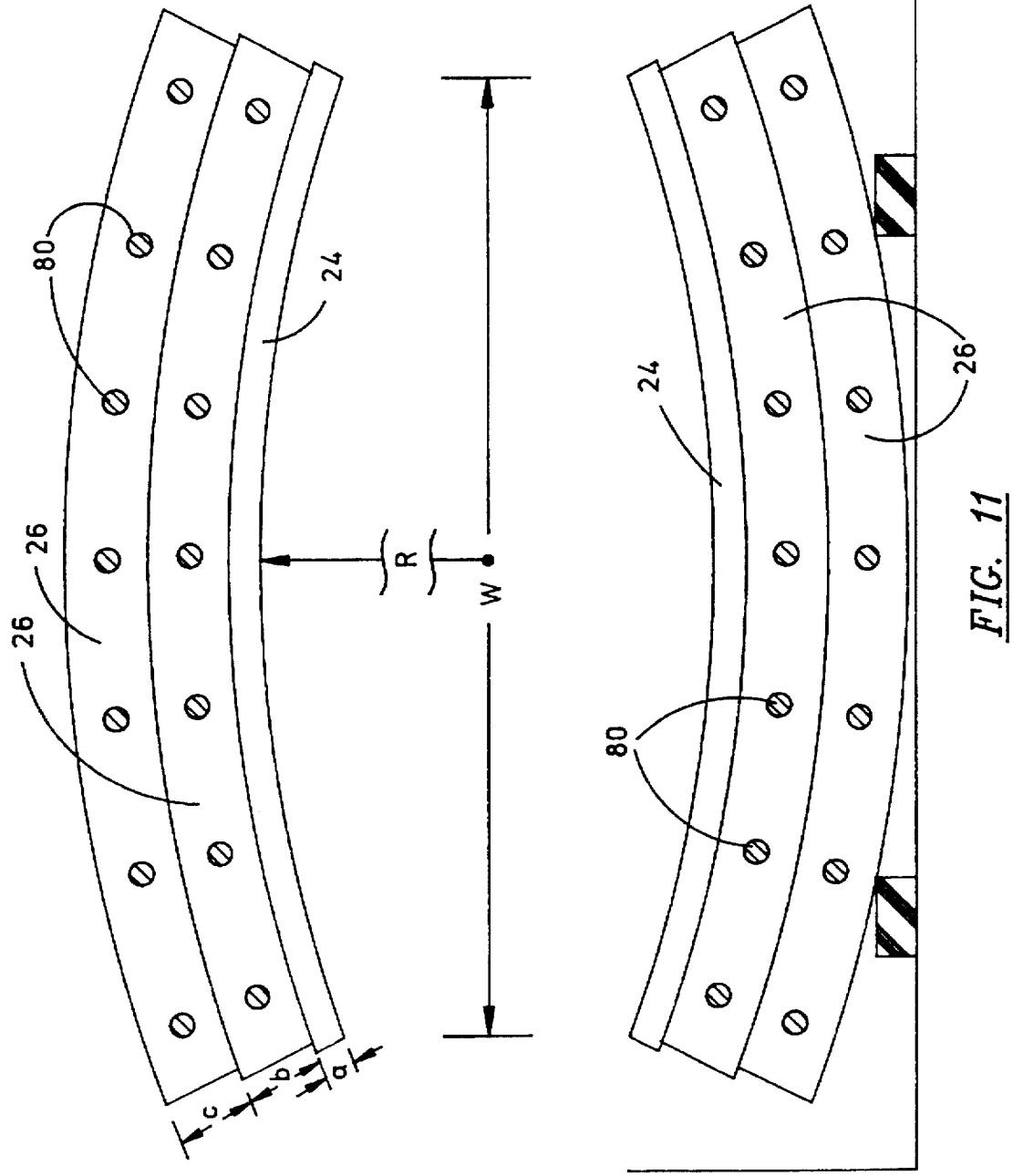
FIG. 11 shows cross sections of top and bottom lengths of a pair of flexible cables and single support band after they are looped, the thicknesses of the cable and band being greatly exaggerated to show thickness relationships.
Figure 14A:
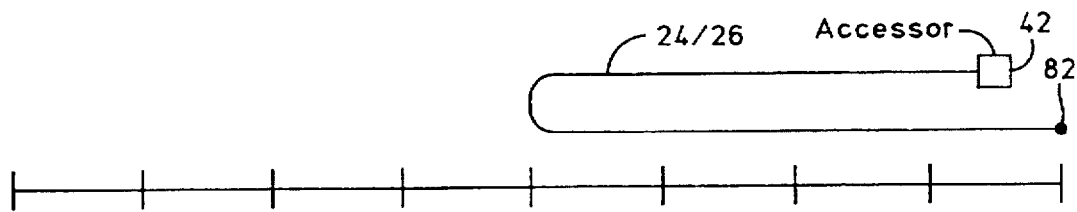
FIGS. 14A–14E illustrate a prior art arrangement of a flexible cable and support band assembly for a modular media library.
Figure 14B:
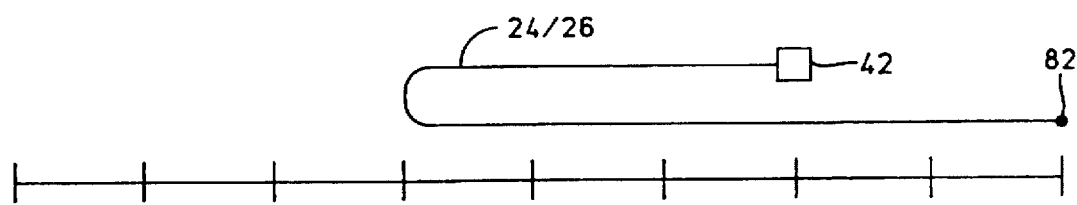
Figure 14C:
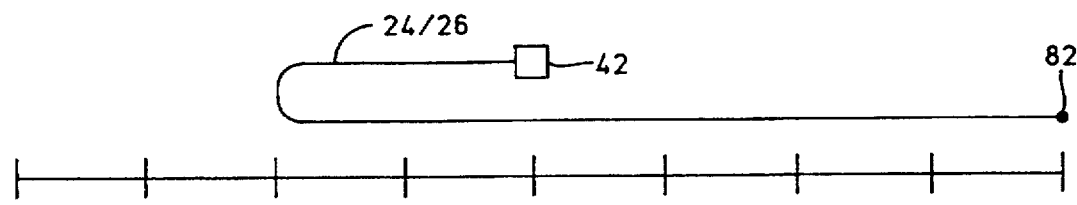
Figure 14D:
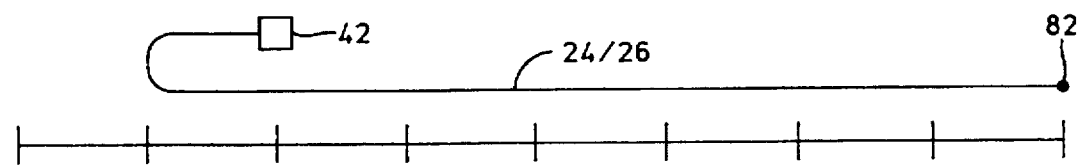
Figure 14E:
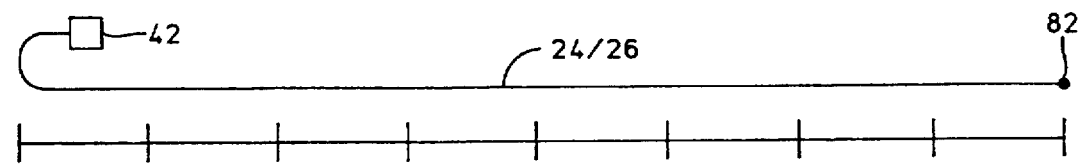

FIG. 11 is an illustration of an exaggerated thickness of the support band 24 and a pair of flexible cables 26. Each flexible cable includes a plurality of conductors 80 which are embedded in a flexible material, such as a polymer. The preferred material for the support band 24 is stainless steel AISI 302. We have found that an acceptable ratio of thicknesses of each of the flexible cables to the support band is 3 to 1. We have constructed an embodiment of the invention wherein the thickness "a" of the support band is 0.010 inches and the thickness "b" of each of the flexible cables is substantially 0.011 inches. The width of each of the support band and the flexible cable is substantially 65 millimeters. The loop of each of the flexible cables and the support band has a radius of substantially 60 millimeters and the cupping of each of the support band and the flexible cable is an arc with a radius of substantially 78 millimeters. The less the radius of the arc the greater the support provided by the support band 24. However, this has to be balanced with respect to the stress placed on the support band due to the cupping as well as the stress placed on the support band at its loop. The cupping radius has a major effect on the loop diameter, as discussed by K. Schulgasser in an article entitled; "Configuration of a Bent Tape of Curved Cross Section", in *Journal of Applied Mechanics of the ASME*, "JNL APPL MECH TRANS ASME", Vol. 59 N3 September 1992, page 692–693. FIGS. 12 and 13 show the stress in the support bands and the stress in the support bands as a percentage of ultimate tensile strength versus various thicknesses of the bands for various cup radii and loop radii. As can be seen from FIG. 13, exceeding the ultimate tensile strength of stainless steel is an important factor to consider. We have found that by employing a support band with a thickness of 0.010 inches that the ultimate tensile strength can be kept to about the 35 level, with a loop radius of about 60 millimeters.

Figure 15A:
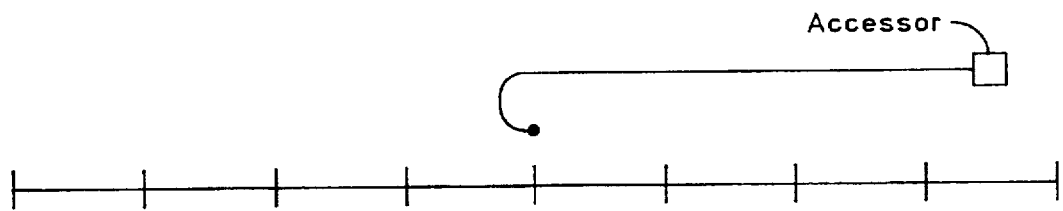
FIGS. 15A–15E illustrate an arrangement of a flexible cable and support band assembly for a modular media library according to the present invention.
Figure 15B:
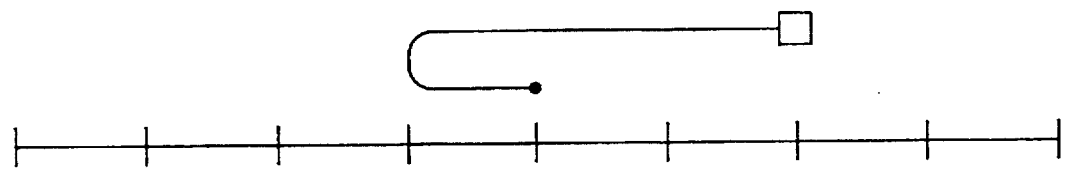
Figure 15C:
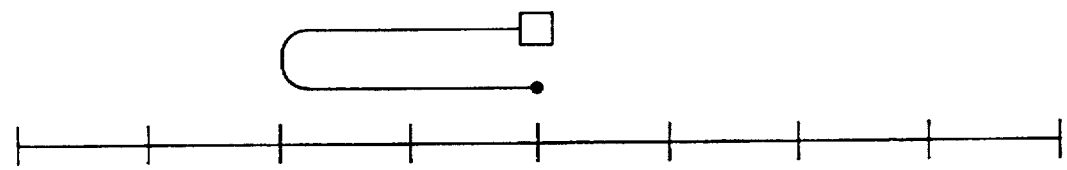
Figure 15D:
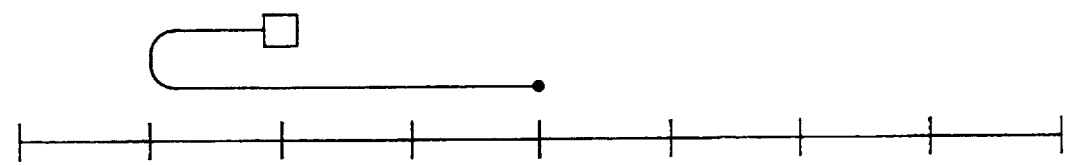
Figure 15E:
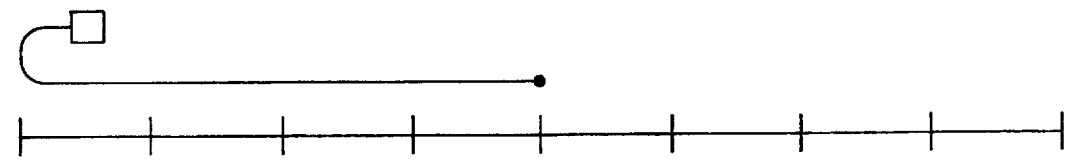
Figure 18A:
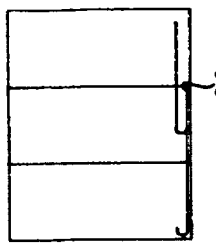
FIGS. 16A–16D, FIGS. 17A–17B and FIGS. 18A–18B illustrate how the scheme illustrated in FIGS. 15A–15E enables a single length of flexible cable and support band to serve various library lengths.
Figure 18B:
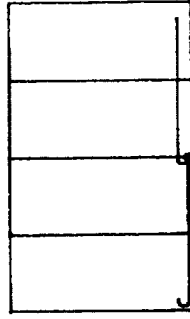
Figure 17A:
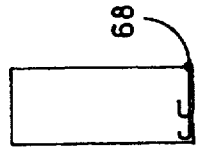
Figure 17B:
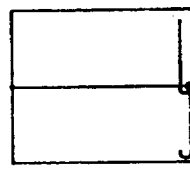
Figure 16A:
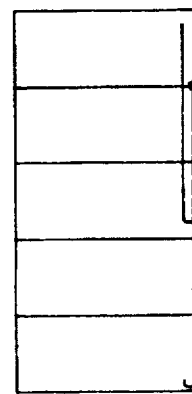
Figure 16B:
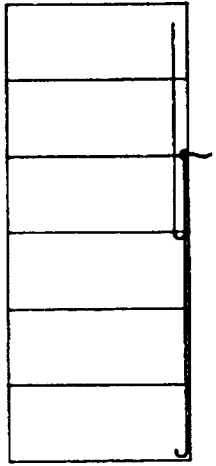
Figure 16C:
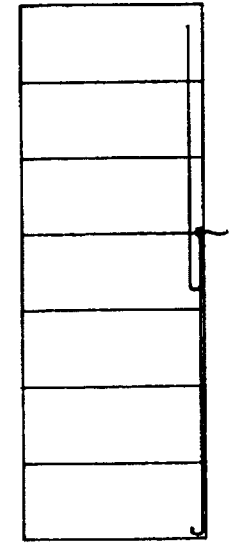
Figure 16D:
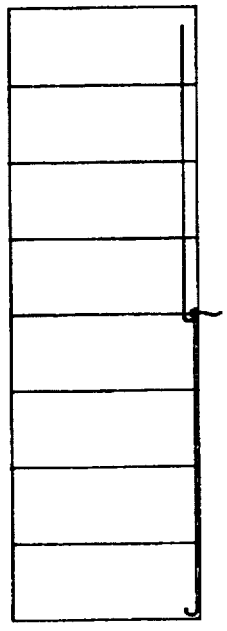

Referring now to FIGS. 14A–14E, there is illustrated a prior art connection of the flexible cable and support band assembly. In FIGS. 14A–14E, the first ends of the flexible cable and the support band are connected at a terminal end 82 of the library in contrast to the central location 68, located in FIG. 6. It can be seen from FIGS. 14A–14E that the assembly can only serve one size of library. As example, if a particular length of the assembly serves eight frames within the library, as illustrated in FIGS. 14A–14E, the assembly cannot serve a lesser number without the loop of the assembly extending beyond the end of the library. We have found by connecting one or more of the flexible cables and the support band at the central location 68, as illustrated in FIGS. 15A–15E, that the assembly can serve a range of sizes of libraries. The range of sizes of libraries that the assembly in FIGS. 15A–15E can serve is illustrated in FIGS. 16A–16D. This range is from 5–8 frames. With the first ends of the flexible cable and the support connected at 68, the accessor can serve 5 frames, 6 frames, 7 frames or 8 frames, as shown in FIGS. 16A–16D, respectively. With a shorter length of the assembly connected at 68, the assembly can serve 3 or 4 frames, as shown in FIGS. 15A and 15B, respectively. With still shorter length of the assembly connected at 68, the accessor can serve 1 or 2 frames, as illustrated in FIGS. 17A and 17B.

We have now described a unique arrangement for optimizing dynamic stability of one or more flexible cables and support band assembly. By cupping the cross-section of both the support band and one or more flexible cables, the one is cupped within the other, with their arcs substantially in a concentric relationship. Accordingly, the support band and the one or more flexible cables move virtually as a unitary element along their first and second lengths and the loops therebetween. Because of the stability, more that one flexible cable can be supported by the support band which is a preferred embodiment. Further dynamic stability is provided by the assembly by providing the longitudinally resilient strips along a support plate, along the bottom of the bottom length of the assembly. These strips center the movement of the flexible cables and support band along a track, restrict rocking movement of the assembly and dampen vibrations. A unique connector has been provided for commonly connecting first end portions and/or second end portions of the flexible cables and support band. The invention further teaches connecting the first ends of the flexible cables and the support band at a center location in the largest library of a range of sizes of libraries so that the assembly can serve the range of sizes.

Obviously many modifications and variations of the invention are possible in light of the above teachings. Therefore, the invention may be practiced otherwise than as specifically described as stated in the following claims.

We claim:

1. A movable flexible cable support band assembly comprising:
    an elongated support;
    at least one flexible electrical cable having a fixed end, which is fixed at a predetermined location on said elongated support, and a free end which is free to move with respect to said predetermined location;
    an elongated support band having a fixed end, which is fixed at said predetermined location, and a second end which is free to move with respect to said predetermined location;

said free ends being interconnected;

each of the flexible electrical cable and the support band having a cross section which is cupped along its respective length with one of the flexible electrical cable and the support band being cupped within and engaging the other one of the flexible electrical cable and the support band along their lengths;

the flexible electrical cable and the support band being curved along their lengths to form a loop between said first and second ends and having first and second elongated extensions that extend from the loop parallel to a longitudinal axis of the support to said first and second ends respectively;

motive power means connected to the free ends and electrically connected to said at least one flexible electrical cable for moving the free ends parallel to said longitudinal axis; and robotic means connected to the motive power means and electrically connected to said at least one flexible electrical cable for accessing articles.

2. An assembly as claimed in claim 1 including:

the cup shape of each of the flexible electrical cable and the support band being an arc; and the arc of each of the flexible electrical cable and the support band being concentric along their lengths.

3. An assembly as claimed in claim 1 wherein said at least one flexible electrical cable is a plurality of flexible electrical cables.

4. An assembly as claimed in claim 1 including:

the fixed ends of the flexible electrical cable and the support band being fixedly connected by a connector; and said connector comprising:

a pair of plates which are cupped to clamp the flexible electrical cable and the support band;

end length portions of the flexible electrical cable and the support band being located between said plates; and means securing the plates together so that the plates squeeze the end length portions of the flexible electrical cable and the support band therebetween in a fixed relationship.

5. An assembly as claimed in claim 1 wherein the elongated support includes a U-shaped channel supporting the first elongated extensions of the flexible electrical cable and the support band.

6. An assembly as claimed in claim 1 including:

the support band being steel; and the flexible electrical cable being a plurality of conductors embedded in a polymer.

7. An assembly as claimed in claim 1 including:

the elongated support including a channel for supporting said first elongated extensions; and resilient means mounted to the channel for guiding movement of the flexible electrical cable and the support band.

8. An assembly as claimed in claim 7 including:

the resilient means comprise a pair of strips which are fixed to the channel in a spaced apart lateral relationship which is less than a width of the flexible electrical cable or the support band.

9. An assembly as claimed in claim 7 wherein said at least one flexible electrical cable is a plurality of flexible electrical cables.

10. An assembly as claimed in claim 7 including:

the channel and the first and second extensions of the flexible electrical cable and the support band being oriented in horizontal directions with the first extensions of the flexible electrical cable and the support band being at a bottom location adjacent the channel and the second extensions of the flexible electrical cable and the support band being at a top location above said bottom location.

11. An assembly as claimed in claim 10 including:

the flexible electrical cable being below the support band along said first extension and being above the support band along said second extension.

12. An assembly as claimed in claim 11 wherein the resilient means includes a pair of strips which are fixed to the channel in a spaced apart lateral relationship which is less than a width of the flexible electrical cable or the support band.

13. An assembly as claimed in claim 12 wherein said at least one flexible electrical cable is a plurality of flexible electrical cables.

14. An assembly as claimed in claim 13 wherein the elongated strips are foam rubber, neoprene or silicone.

15. An assembly as claimed in claim 1 including:

the robotic means being capable of accessing a plurality of receptacles in a plane parallel to said first and second extensions; and said predetermined end being located intermediate a length of the support.

16. An assembly as claimed in claim 15 including:

each of the fixed ends of the flexible electrical cable and the support band being fixedly connected to the support by a respective connector; and said connector comprising:

a pair of plates which are cupped to match the cupping of the flexible electrical cable and the support band;

end length portions of the flexible electrical cable and the support band being located between said plates; and means securing the plates together so that the plates squeeze the end length portions of the flexible electrical cable and the support band therebetween in a fixed relationship.

17. An assembly as claimed in claim 15 including:

the cup shape of each of the flexible electrical cable and the support band being an arc; and the arcs of the flexible electrical cable and the support band being concentric.

18. An assembly as claimed in claim 15 wherein said at least one flexible electrical cable is a plurality of flexible electrical cables.

19. An assembly as claimed in claim 15 including:

the channel and the first and second extensions of the flexible electrical cable and the support band being oriented in horizontal directions with the first extensions of the flexible electrical cable and the support band being at a bottom location adjacent the channel and the second extensions of the flexible electrical cable and the support band being at a top location above said bottom location.

20. An assembly as claimed in claim 19 wherein said at least one flexible electrical cable is a plurality of flexible electrical cables.

21. An assembly as claimed in claim 20 including:

the cup shape of each of the flexible electrical cable and the support band being an arc; and the arcs of the flexible electrical cable and the support band being concentric.

22. An assembly as claimed in claim 21 including:

the fixed ends of the flexible electrical cable and the support band being fixedly connected to the elongated support by a connector; and said connector comprising:

a pair of plates which are cupped to clamp the flexible electrical cable and the support band;

end length portions of the flexible electrical cable and the support band being located between said plates; and means securing the plates together so that the plates squeeze the end length portions of the flexible electrical cable and the support band therebetween in a fixed relationship.

23. An assembly as claimed in claim 1 including:

the motive power means including an elongated channel for supporting said first elongated extensions; and the channel and the first and second extensions of the flexible electrical cable and the support band being oriented in horizontal directions with the first extensions of the flexible electrical cable and the support band being at a bottom location adjacent the channel and the second extensions of the flexible electrical cable and the support band being at a top location above said bottom location.

24. An assembly as claimed in claim 23 including:

the cup shape of each of the flexible electrical cable and the support band being an arc; and the arcs of the flexible electrical cable and the support band being concentric.

25. An assembly as claimed in claim 24 including:

resilient means mounted to the channel for guiding movement of the flexible electrical cable and the support band.

26. An assembly as claimed in claim 25 wherein the resilient means includes a pair of strips which are fixed to the channel in a spaced apart lateral relationship which is less than a width of the flexible electrical cable or the support band.

27. An assembly as claimed in claim 26 including:

the robotic means being capable of accessing a plurality of receptacles in a plane parallel to said first and second extensions; and said predetermined end being located intermediate a length of the support.

28. An assembly as claimed in claim 27 wherein said at least one flexible electrical cable is a plurality of flexible electrical cables.

29. An assembly as claimed in claim 28 including:

the support band being steel; and the flexible electrical cable being a plurality of conductors embedded in polyethylene.

30. An assembly as claimed in claim 29 including:

the fixed ends of the flexible electrical cable and the support band being fixedly connected to the support by a connector; and said connector comprising:

a pair of plates which are cupped to match the cupping of the flexible electrical cable and the support band;

end length portions of the flexible electrical cable and the support band being located between said plates; and means securing the plates together so that the plates squeeze the end length portions of the flexible electrical cable and the support band therebetween in a fixed relationship.

31. An assembly as claimed in claim 30 wherein the elongated support includes a U shaped channel.

32. An assembly as claimed in claim 31 including:

the plurality of flexible electrical cables being two; and a thickness of the support band being substantially one third a thickness of a flexible electrical cable.

33. An assembly as claimed in claim 32 wherein the elongated strips are foam rubber, neoprene or silicone.

* * * * *